United States Patent
Ishikawa et al.

(10) Patent No.: US 9,872,231 B2
(45) Date of Patent: Jan. 16, 2018

(54) COMMUNICATION DEVICE

(71) Applicant: KYOCERA Corporation, Kyoto-shi, Kyoto (JP)

(72) Inventors: Shuuji Ishikawa, Kyoto (JP); Daisuke Mori, Kyoto (JP)

(73) Assignee: Kyocera Corporation, Kyoto (JP)

(*) Notice: Subject to any disclaimer, the term of this patent is extended or adjusted under 35 U.S.C. 154(b) by 0 days.

(21) Appl. No.: 14/436,447

(22) PCT Filed: Oct. 15, 2013

(86) PCT No.: PCT/JP2013/077976
§ 371 (c)(1),
(2) Date: Apr. 16, 2015

(87) PCT Pub. No.: WO2014/061663
PCT Pub. Date: Apr. 24, 2014

(65) Prior Publication Data
US 2015/0245284 A1    Aug. 27, 2015

(30) Foreign Application Priority Data
Oct. 16, 2012    (JP) ................. 2012-229269

(51) Int. Cl.
*H04M 3/00* (2006.01)
*H04W 48/16* (2009.01)
(Continued)

(52) U.S. Cl.
CPC ............. *H04W 48/16* (2013.01); *H04W 8/02* (2013.01); *H04M 1/72583* (2013.01); *H04W 88/06* (2013.01)

(58) Field of Classification Search
CPC ....... H04W 48/16; H04W 92/02; H04W 8/02; H04M 3/42059; H04M 3/4234; H04M 3/42195
(Continued)

(56) References Cited

U.S. PATENT DOCUMENTS 5,442,806 A * 8/1995 Barber .................. H04W 48/18
                                                            455/435.2
5,732,349 A * 3/1998 Sanpei .................. H04W 8/183
                                                            455/435.1
(Continued)

FOREIGN PATENT DOCUMENTS

EP         1197109 A      4/2002
JP    2001-326975 A     11/2001
(Continued)

OTHER PUBLICATIONS

International Search Report dated Jan. 21, 2014 issued in counterpart International application No. PCT/JP2013/077976.
(Continued)

*Primary Examiner* — Charles Shedrick
(74) *Attorney, Agent, or Firm* — Procopio Cory Hargreaves and Savitch LLP

(57) ABSTRACT

Provided is a communication device that determines whether Long Term Evolution (LTE) is to be included in scanning on a per area basis, enabling LTE to be effectively used, while minimizing unnecessary processing. The communication device is provided with a first communication control unit (31) and a second communication control unit (32). The second communication unit (32) enables a setting so as to include a prescribed communication system in scanning, or disables the setting so as to exclude the prescribed system from scanning. The first communication unit (31) controls the second communication unit in such a manner that the setting is disabled so as to exclude the
(Continued)

prescribed communication system from scanning if an overseas public network is being used by the second communication unit (32) to wait for communication.

11 Claims, 7 Drawing Sheets

(51) Int. Cl.
*H04W 8/02* (2009.01)
*H04W 88/06* (2009.01)
*H04M 1/725* (2006.01)

(58) Field of Classification Search
USPC .................................. 455/418, 434
See application file for complete search history.

(56) References Cited

U.S. PATENT DOCUMENTS

| | | | |
|---|---|---|---|
| 6,567,667 B1* | 5/2003 | Gupta | H04W 48/18 455/434 |
| 6,909,892 B2 | 6/2005 | Tuji et al. | |
| 9,241,303 B2 | 1/2016 | Ito et al. | |
| 2001/0044298 A1 | 11/2001 | Tuji et al. | |
| 2005/0102529 A1* | 5/2005 | Buddhikot | H04L 63/02 726/26 |
| 2005/0107082 A1 | 5/2005 | Gunaratnam et al. | |
| 2006/0075090 A1* | 4/2006 | Bocking | H04W 48/18 709/224 |
| 2006/0079224 A1* | 4/2006 | Welnick | H04W 8/183 455/432.1 |
| 2007/0076696 A1* | 4/2007 | An | H04L 29/06027 370/352 |
| 2007/0280453 A1* | 12/2007 | Kelley | H04L 67/16 379/201.01 |
| 2007/0300252 A1* | 12/2007 | Acharya | H04N 7/165 725/25 |
| 2010/0291924 A1* | 11/2010 | Antrim | H04W 60/00 455/433 |
| 2013/0095812 A1* | 4/2013 | Siddam | H04L 41/0893 455/419 |
| 2013/0130643 A1* | 5/2013 | Bacareza | H04L 29/06537 455/406 |
| 2013/0151658 A1* | 6/2013 | Baker | H04L 67/1095 709/217 |
| 2013/0196662 A1 | 8/2013 | Ito et al. | |
| 2014/0073302 A1 | 3/2014 | Trethewey et al. | |
| 2014/0274039 A1* | 9/2014 | Shah | H04W 48/16 455/434 |
| 2015/0245284 A1* | 8/2015 | Ishikawa | H04W 8/02 455/418 |

FOREIGN PATENT DOCUMENTS

| | | |
|---|---|---|
| JP | 2003-507983 A | 2/2003 |
| JP | 2007-511141 A | 4/2007 |
| JP | 2009-010785 A | 1/2009 |
| JP | 2010-068408 A | 3/2010 |
| JP | 2010-178203 A | 8/2010 |
| JP | 2010-245631 A | 10/2010 |
| JP | 2011-259194 A | 12/2011 |
| JP | 2012-109662 A | 6/2012 |
| JP | 2012-134853 A | 7/2012 |
| WO | 2010-047845 A1 | 4/2010 |
| WO | 2010/105222 A1 | 9/2010 |
| WO | 2012/037281 A1 | 3/2012 |

OTHER PUBLICATIONS

Office Action dated Apr. 5, 2016, issued in counterpart Japanese application No. 2014-542144.
3GPP TS 23.272 V11.2.0, "Circuit Switched (CS) fallback in Evolved Packet System (EPS); Stage 2," Sep. 2012.
International Search Report for International Application No. PCT/JP2013/078109 dated Jan. 21, 2014.
Office Action dated Jul. 29, 2016, issued in counterpart U.S. Appl. No. 14/436,434.
Office Action dated Nov. 29, 2016 issued by the Japanese Patent Office for the counterpart Japanese Patent pplication No. 2014-542144.
Office Action for Japanese Patent Application No. 2014-542163 dated Oct. 6, 2015.

* cited by examiner

FIG. 3

| ITEM NO. | CURRENT STANDBY STATE | LTE_ON BY SETTING UNIT | | LTE_OFF BY SETTING UNIT | |
|---|---|---|---|---|---|
| | | CURRENTLY LTE_Enable | CURRENTLY LTE_Disable | CURRENTLY LTE_Enable | CURRENTLY LTE_Disable |
| 1 | OVERSEAS PUBLIC NETWORK | LTE_Disable SETTING | NO SETTING CHANGE | | LTE_Enable SETTING |
| 2 | DOMESTIC PUBLIC NETWORK | NO SETTING CHANGE | LTE_Enable SETTING | | LTE_Enable SETTING |
| 3 | OUT OF SERVICE | NO SETTING CHANGE | NO SETTING CHANGE | | LTE_Enable SETTING |
| 4 | POWER SAVING | NO SETTING CHANGE | NO SETTING CHANGE | | LTE_Enable SETTING |

FIG. 4

| ITEM NO. | CURRENT STANDBY STATE | LTE_ON BY SETTING UNIT | | LTE_OFF BY SETTING UNIT | |
|---|---|---|---|---|---|
| | | CURRENTLY LTE_Enable | CURRENTLY LTE_Disable | CURRENTLY LTE_Enable | CURRENTLY LTE_Disable |
| 1 | OVERSEAS PUBLIC NETWORK | NO RESTART | NO RESTART | | NO RESTART |
| 2 | DOMESTIC PUBLIC NETWORK | NO RESTART | RESTART | | NO RESTART |
| 3 | OUT OF SERVICE | NO RESTART | NO RESTART | | NO RESTART |
| 4 | POWER SAVING | NO RESTART | RESTART | | NO RESTART |

US 9,872,231 B2

COMMUNICATION DEVICE

TECHNICAL FIELD

The present invention relates to a communication device and a method for controlling communication device.

BACKGROUND ART

As a communication system used by an electronic device such as a cellular telephone device, a CDMA communication system and an LTE (Long Term Evolution) communication system can be exemplified.
[Patent Document 1] Japanese Unexamined Patent Application, Publication No. 2012-134853

DISCLOSURE OF THE INVENTION

Problems to be Solved by the Invention

In a case in which the cellular telephone device moves to an area, which does not employ a predetermined communication system, if the predetermined communication system is included in a scan target, an unnecessary process of scanning for the predetermined communication system takes place.

The present invention is aimed at providing a communication device that allows for effective use of a predetermined communication system while suppressing the unnecessary process, by determining, for each area, whether the predetermined communication system is to be included in the scan target or not.

Means for Solving the Problems

In order to solve the abovementioned problem, the communication device according to the present invention is provided with a first communication control unit and a second communication control unit. The second communication control unit includes a predetermined communication system in a scan target, or excludes the predetermined communication system from the scan target. The first communication control unit controls the second communication control unit to exclude the predetermined communication system from the scan target in a case in which communication standby takes place by the second communication control unit using an overseas public network.

The communication device can also be configured such that the first communication control unit controls the second communication control unit to include the predetermined communication system in the scan target in a case in which communication standby takes place by the second communication control unit using a domestic public network.

The communication device can also be configured such that the first communication control unit controls the second communication control unit to start new scanning for communication systems including the predetermined communication system.

The communication device can also be configured such that, in a case of excluding the predetermined communication system from the scan target, the second communication control unit continues excluding the predetermined communication system even if no communication system with which communication can be established is found as a result of scanning for all other communication systems.

The communication device can also be configured such that the first communication control unit determines whether a network used for current communication standby is an overseas public network or a domestic public network, based on information transmitted from a base station provided by the second communication control unit.

The communication device can also be configured such that the second communication control unit sets the predetermined communication system as a communication system to be scanned for first.

In order to solve the abovementioned problem, a communication device according to the present invention includes a control unit that includes a predetermined communication system in a scan target, or excludes the predetermined communication system from the scan target. The control unit excludes the predetermined communication system from the scan target in a case in which communication standby takes place using an overseas public network.

Effects of the Invention

According to the present invention, an effective use of a predetermined communication system while suppressing the unnecessary process is realized, by determining, for each area, whether the LTE is to be included in the scan target or not.

BRIEF DESCRIPTION OF THE DRAWINGS

FIG. 3 is a schematic diagram of a table for determining whether the LTE is to be enabled or disabled in a case of standby in an overseas public network;

FIG. 4 is a schematic diagram of a table for determining whether the communication system is to be restarted or not in a case of standby in the overseas public network;

PREFERRED MODE FOR CARRYING OUT THE INVENTION

An embodiment of the present invention is described hereinafter. In the present embodiment, a cellular telephone device 1 is described as an example of the communication device.

Figure 1:
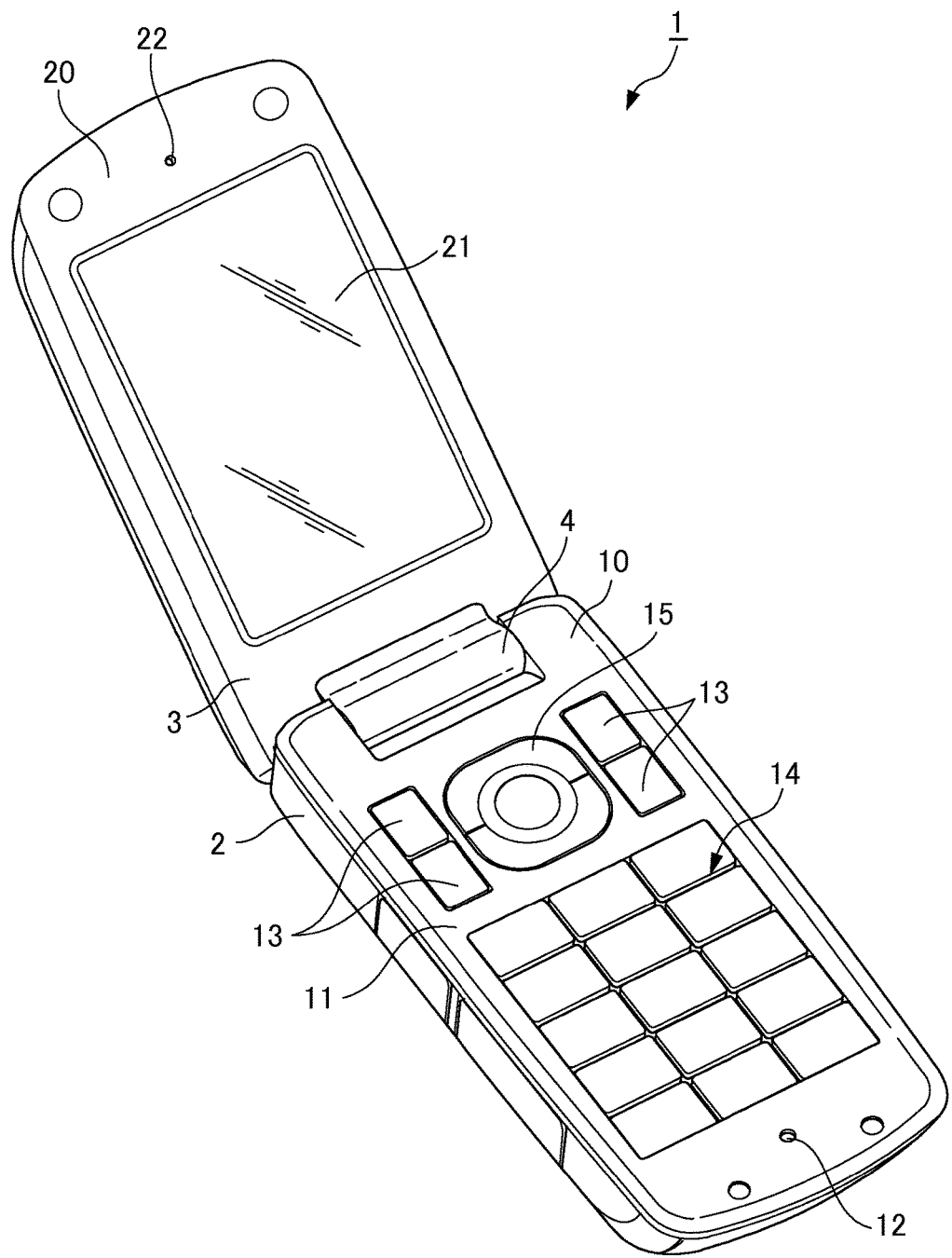
FIG. 1 is a perspective view showing an appearance of a cellular telephone device according to an embodiment.

FIG. 1 is a perspective view showing an appearance of the cellular telephone device 1 according to the present embodiment.

FIG. 1 shows a configuration of a so-called flip type cellular telephone device. However, the configuration of the cellular telephone device according to the present invention is not limited to the configuration shown in FIG. 1. The cellular telephone device can also be, for example, a slider-type in which one body slides in one direction from a state in which two bodies are mutually superimposed. The cellular telephone device can also be, for example, a rotating type (turning type) in which one body is rotated about an axis line along the direction in which two bodies are superimposed. The cellular telephone device can also be, for example, a type in which an operation unit and a display unit are arranged in one body without a connection unit (straight type).

The cellular telephone device 1 is configured to include an operation unit side body 2 and a display unit side body 3. The operation unit side body 2 is provided with an operation unit 11 and a microphone 12 on a surface portion 10. To the microphone 12, sounds, which a user of the cellular telephone device 1 produces during a phone call and during use of a speech recognition application, are input. The operation unit 11 is composed of feature setting operation buttons 13, input operation buttons 14, and a selection operation button 15. The feature setting operation buttons 13 are for operating various setting features and various features such as a telephone number directory feature and a mail feature. The input operation buttons 14 are for inputting digits of a telephone number and characters for mail. The selection operation button 15 is for performing selection of the various operations, scrolling and the like.

The display unit side body 3 is provided with a display unit 21 and a receiver 22 on a surface portion 20. The display unit 21 displays various kinds of information. The receiver 22 outputs sound of other party of a call.

An upper end portion of the operation unit side body 2 and a lower end portion of the display unit side body 3 are connected via a hinge mechanism 4. The cellular telephone device 1 can be switched between an open state and a closed state by relatively rotating the operation unit side body 2 and the display unit side body 3 connected via the connecting portion 4. The open state is a state in which the operation unit side body 2 and the display unit side body 3 are open with respect with each other. The closed state is a state in which the operation unit side body 2 and the display unit side body 3 are folded.

The cellular telephone device 1 thus configured operates for allowing an effective use of LTE while suppressing the unnecessary process by determining, for each area, whether LTE is to be included in the scan target or not. A specific configuration is described hereinafter.

Figure 2:
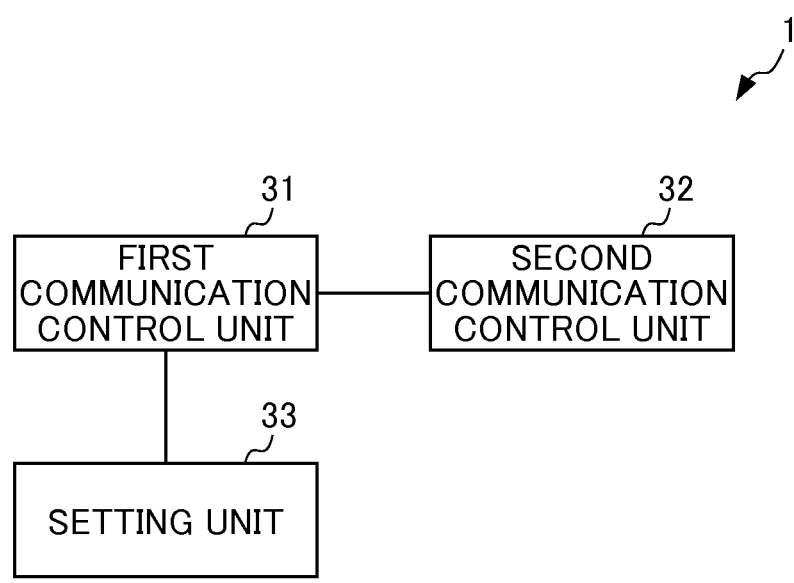
FIG. 2 is a block diagram showing functions of the cellular telephone device according to an embodiment.

FIG. 2 is a block diagram showing functions of the cellular telephone device according to an embodiment.

As shown in FIG. 2, the cellular telephone device 1 is provided with a first communication control unit 31 and a second communication control unit 32.

Here, the cellular telephone device 1 according to the present embodiment is assumed to have an Android (registered trademark) system installed therein. The Android system is composed of a Linux (registered trademark) unit and a Modem unit. The Linux unit has a Telephony functional unit and a QCRIL functional unit being implemented therein.

In the CDMA communication system, the Modem unit establishes a communication connection according to a request from the Telephony functional unit being implemented in the Linux unit.

In the communication system supporting the LTE system (hereinafter referred to as an LTE communication system), sequences of establishing a PPP session and acquiring an IP address are different from those of conventional 2G/3G terminals of CDMA, GSM (registered trademark), UMTS or the like, and a communication connection establishing process is performed in an asynchronous manner between the Modem unit and the Linux unit.

The Telephony functional unit corresponds to the first communication control unit 31. The QCRIL functional unit corresponds to the second communication control unit 32.

The second control unit 32 enables setting in order to include a predetermined communication system in a scan target, or disables setting in order to exclude the predetermined communication system from the scan target. The predetermined communication system indicates the LTE.

The first communication control unit 31 controls the second communication control unit 32 to exclude the predetermined communication system from the scan target in a case in which communication standby takes place by the second communication control unit 32 using an overseas public network.

This is an especially effective method in a case in which use of the LTE in foreign countries is restricted.

When the cellular telephone device is powered on with a setting that includes the LTE in the scan target, the cellular telephone device starts scanning from the LTE communication system, which is of high priority. If the cellular telephone device cannot acquire the LTE communication system, scanning for a subsequent communication system (overseas public network) then starts.

If standby is successful in the subsequent communication system, the cellular telephone device performs a call communication and a data communication using this communication system.

If the cellular telephone device moves from an area of the communication system in which standby takes place and becomes out of service due to the movement or the like, the cellular telephone device starts scanning for communication systems in order to acquire another communication system.

The cellular telephone device starts scanning from the LTE communication system but if the LTE communication system cannot be acquired, scanning for a subsequent communication system then starts.

As described above, scanning for the LTE communication system, which is impossible to acquire, was performed, causing an unnecessary process.

The cellular telephone device 1 of the present Example changes a setting to exclude the LTE communication system from the scan target in a case in which communication standby takes place using an overseas public network, thereby suppressing unnecessary processes in foreign countries.

The control unit including the first communication control unit 31 and the second communication control unit 32 can also be configured to include a predetermined communication system in a scan target, or to exclude the predetermined communication system from the scan target. In such a configuration, the control unit excludes the predetermined communication system from the scan target in a case in which communication standby takes place using an overseas public network.

The first communication control unit 31 can also be configured to control the second communication control unit 32 to enable a setting to include the predetermined communication system in the scan target in a case in which communication standby takes place by the second communication control unit 32 using a domestic public network.

If the setting is changed to exclude the LTE communication system from the scan target as described above, and not restored even after returning to Japan, it is impossible to acquire the LTE communication system.

The cellular telephone device 1 of the present Example changes (restores) the setting to include the LTE communication system in the scan target in a case in which communication standby takes place using the domestic public network, thereby effectively using the LTE domestically.

The first communication control unit 31 can also be configured to control the second communication control unit 32 to start new scanning for communication systems including the predetermined communication system thus enabled.

In such a configuration, if the setting has been changed to include the LTE communication system in the scan target in a state in which communication standby takes place by a communication system other than the LTE, the cellular telephone device 1 starts scanning from the LTE communication system, thereby allowing an effective use of the LTE.

The second communication control unit 32 can also be configured to, in a case in which the setting has been disabled to exclude the predetermined communication system from the scan target, continue excluding the predetermined communication system even if no communication system with which communication can be established is found as a result of scanning for all other communication systems.

In such a configuration, if the setting has been changed to exclude the LTE communication system from the scan target, the cellular telephone device 1 maintains the setting thus changed to exclude the LTE communication system from the scan target until the setting is restored.

In other words, the cellular telephone device 1 can suppress unnecessary processes by continuing excluding the LTE communication system from the scan target in an environment where the LTE communication system cannot be acquired.

The first communication control unit 31 can also be configured to determine whether a network used for current communication standby is an overseas public network or a domestic public network, based on information transmitted from a base station provided by the second communication control unit 32.

After acquiring a communication unit as a result of scanning, the cellular telephone device 1 makes a predetermined request (for example, registration) with respect to a base station. The base station submits predetermined information to the cellular telephone device 1. The predetermined information is information uniquely assigned for identification of a base station, and includes an NID (Network ID), an SID (System ID), an MCC (Mobile country code), MNC (mobile network code) and the like.

Based on the NID and the like, the first communication control unit 31 can determine whether a network used for current communication standby, in other words a current location, is domestic or overseas.

The cellular telephone device 1 thus determines whether the LTE is to be included in the scan target or not depending on whether the current location is domestic or overseas, and therefore an effective use of the LTE is realized while suppressing the unnecessary processes.

The second communication control unit 32 can also be configured to set the predetermined communication system as a communication system to be scanned for first among communication systems which are scan target.

In such a configuration, the cellular telephone device 1 performs scanning while giving the LTE communication system priority, thereby allowing an effective use of the LTE.

Example

Here, the order of priority of the communication system search is LTE>1x>eHRPD>GSM>UMTS and, in a case in which scanning for LTE is enabled, the scanning starts from the LTE communication system during standby in the domestic public network standby and standby in the overseas public network.

The scanning starts from the LTE communication system even in foreign countries in which the LTE is not supported, causing unnecessary scanning.

In addition, since the scanning follows the order of priority in a power-saving state regardless of whether the current location is domestic or overseas, the scanning starts from the LTE communication system.

The cellular telephone device 1 thus wastes electricity due to unnecessary scanning, despite a shift to the power-saving state for saving electric power.

Given this, the cellular telephone device 1 of the present Example controls to disable the LTE during standby in the overseas public network. In addition, the cellular telephone device 1 controls not to enable the LTE even in a power-saving mode, if the network used before going out of service is the overseas public network. Here, to disable the LTE indicates a setting of excluding the LTE communication system from the scan target (to enable setting); and to enable the LTE indicates a setting of including the LTE communication system in the scan target (to disable setting).

FIG. 3 is a schematic diagram of a table for determining whether the LTE is to be enabled or disabled in a case of standby in the overseas public network. The cellular telephone device 1 determines whether the LTE is to be enabled or disabled, with reference to the table.

As shown in FIG. 3, the cellular telephone device 1 disables the LTE in a case of standby in the overseas public network when the LTE is out of service. The cellular telephone device 1 enables the LTE in a case of standby in the domestic public network.

A user can operate the cellular telephone device 1 to configure the use of LTE to be ON (enabled) or OFF (disabled) in advance.

The cellular telephone device 1 gives priority to the configuration, and therefore, in a case in which the use of LTE is configured to be OFF (disabled), does not enable the LTE even during standby in the domestic public network.

In a case of shift to the power saving mode in the overseas public network, the cellular telephone device 1 does not enable the LTE even if the use of LTE is configured to be ON (enabled) by a setting unit 33, in order to suppress electric power consumption due to scanning of out-of-service LTE in foreign countries.

Upon returning to a home country from abroad and entering standby in the domestic public network, the cellular telephone device 1 enables the LTE on the condition that the use of LTE is configured to be ON (enabled) by the setting unit 33.

FIG. 4 is a schematic diagram of a table for determining whether the communication system is to be restarted or not in a case of standby in the overseas public network. Upon restarting the communication system, the cellular telephone device 1 turns the communication system which is on standby of communication into a disconnected state and starts scanning from high priority communication system.

As shown in FIG. 4, the LTE is currently disabled in the cellular telephone device 1, and, in a state in which standby takes place in the domestic communication network and the use of LTE is configured to be ON (enabled) by the setting unit 33, the cellular telephone device 1 restarts the communication system and starts scanning from the LTE communication system.

As shown in FIG. 4, in the power saving state, the cellular telephone device 1 does not restart the communication system even in a case in which the LTE is currently disabled; standby takes place in the domestic communication network; and the use of LTE is configured to be ON (enabled) by the setting unit 33.

Figure 5:
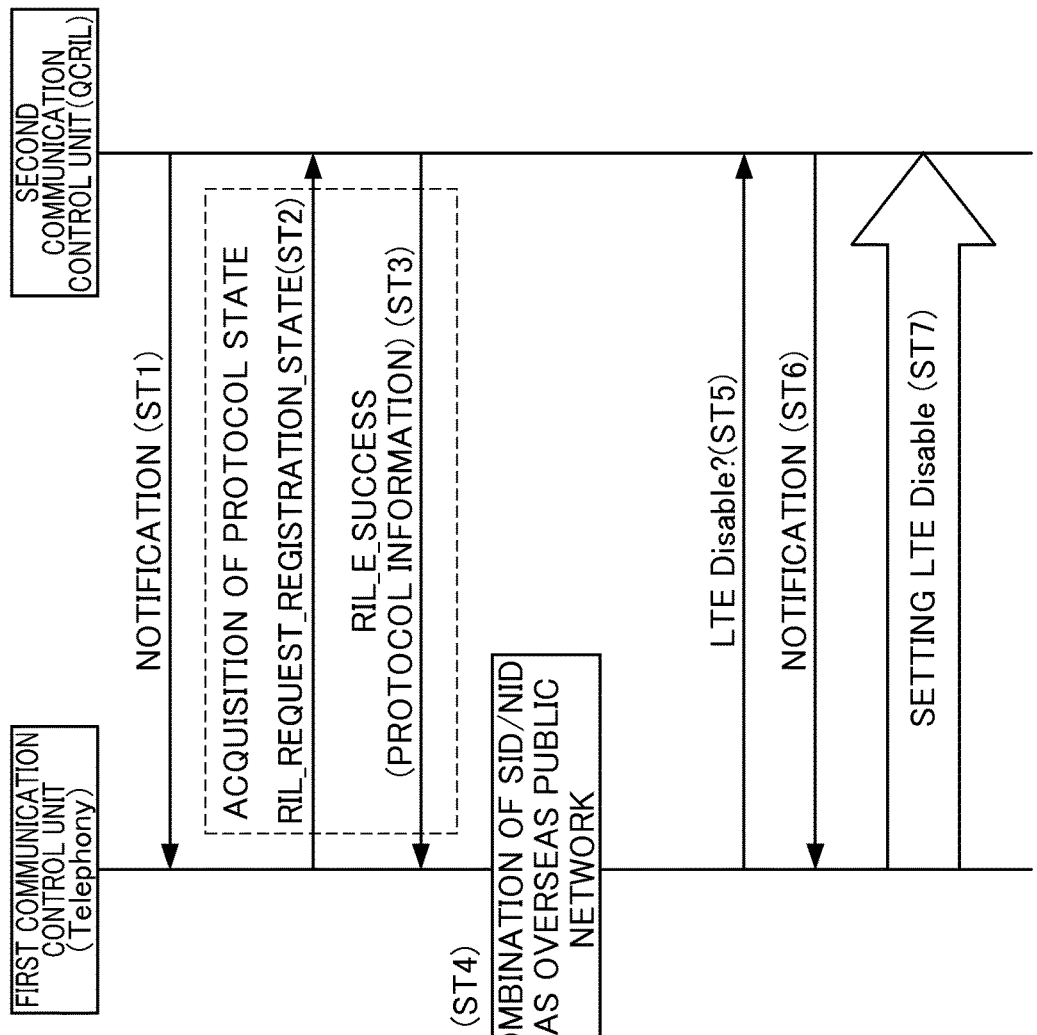
FIG. 5 is a diagram for illustrating a sequence in a case of standby in the overseas public network.

Here, a sequence in a case of standby in the overseas public network is described with reference to a timing chart shown in FIG. 5. FIG. 5 is a diagram for illustrating the sequence in a case of standby in the overseas public network.

In Step ST1, in a case in which information indicating entrance into a service area is received from the modem, the second communication control unit 32 notifies the first communication control unit 31 of the information.

In Step ST2, the first communication control unit 31 makes a request for a protocol state. More specifically, the first communication control unit 31 submits RIL_REQUEST_REGISTRATION_STATE to the second communication control unit 32 and makes a request for information of the communication system used for standby on the modem side.

In Step ST3, the second communication control unit 32 submits the information notified from the modem to the first communication control unit 31. More specifically, the second communication control unit 32 submits RIL_E_SUCCESS to the first communication control unit 31.

In Step ST4, the first communication control unit 31 determines the type of the communication system used for standby on the modem side based on the protocol information received in Step ST3. In the present Example, the first communication control unit 31 determines the communication system to be the overseas public network based on the SID and the NID included in the protocol information.

In Step ST5, the first communication control unit 31 queries the second communication control unit 32 whether the LTE is disabled or not.

In Step ST6, the second communication control unit 32 notifies whether the LTE is disabled or enabled, in response to the query in Step ST5. In the present Example, the second communication control unit 32 notifies that the LTE is enabled.

In Step ST17, the first communication control unit 31 requests the second communication control unit 32 to disable the LTE. In response to the request, the second communication control unit 32 changes the setting to disable the LTE.

The cellular telephone device 1 thus changes a setting to exclude the LTE communication system from the scan target in a case in which communication standby takes place using an overseas public network, thereby suppressing unnecessary processes in foreign countries.

Figure 6:
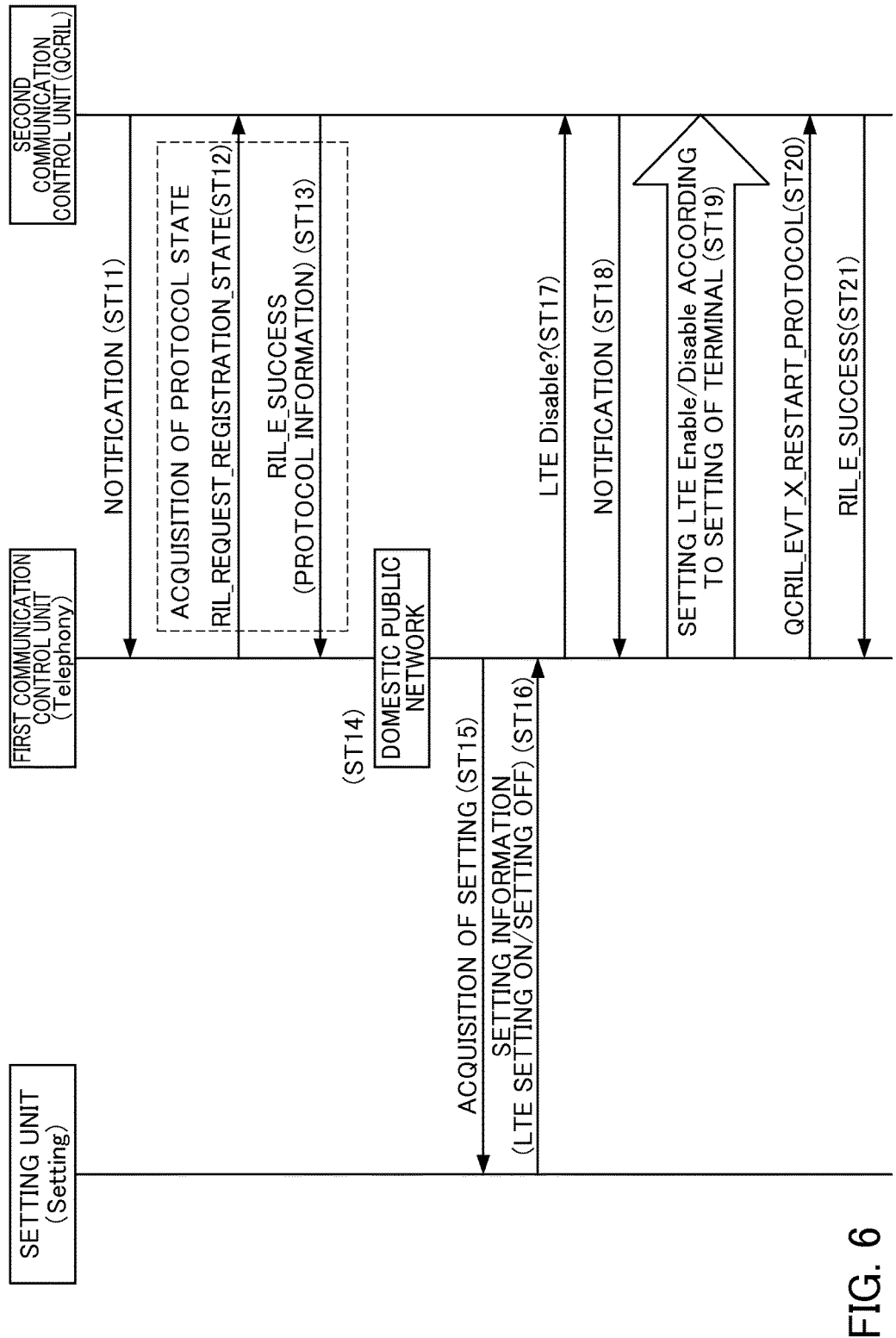
FIG. 6 is a diagram for illustrating a sequence in a case of standby in a domestic public network.

Next, a sequence in a case of standby in the domestic public network is described with reference to a timing chart shown in FIG. 6. FIG. 6 is a diagram for illustrating the sequence in a case of standby in the domestic public network.

In Step ST11, in a case in which information indicating entrance into a service area is received from the modem, the second communication control unit 32 notifies the first communication control unit 31 of the information.

In Step ST12, the first communication control unit 31 acquires the protocol state. More specifically, the first communication control unit 31 submits RIL_REQUEST_REGISTRATION_STATE to the second communication control unit 32 and makes a request for information of the communication system used for standby on the modem side.

In Step ST13, the second communication control unit 32 submits the information notified from the modem to the first communication control unit 31. More specifically, the second communication control unit 32 submits RIL_E_SUCCESS to the first communication control unit 31.

In Step ST14, the first communication control unit 31 determines the type of the communication system used for standby on the modem side based on the protocol information received in Step ST3. In the present Example, the first communication control unit 31 determines the communication system to be the domestic public network based on the SID and the NID included in the protocol information.

In Step ST15, the first communication control unit 31 requests acquisition of setting information configured in the setting unit 33 (Setting).

In Step ST16, the setting unit 33 submits the setting information to the first communication control unit 31. The setting unit 33 has the setting information regarding whether to configure the use of LTE to be ON (enabled) or OFF (disabled), according to the user's operation. In the present Example, the use of LTE is assumed to be ON (enabled).

In Step ST17, the first communication control unit 31 queries the second communication control unit 32 whether the LTE is disabled or not.

In Step ST18, the second communication control unit 32 notifies whether the LTE is disabled or enabled, in response to the query in Step ST17. In the present Example, the second communication control unit 32 notifies that the LTE is disabled.

In Step ST19, the first communication control unit 31 requests the second communication control unit 32 to enable the LTE from the disabled state. In response to the request, the second communication control unit 32 changes the setting to enable the LTE.

In Step ST20, the first communication unit 31 controls the second communication control unit 32 to restart the communication system. More specifically, the first communication unit 31 submits QCRIL_ENT_X_RESTART_PROTOCOL to the second communication control unit 32 to request restart of the communication system. The modem side starts scanning from the LTE communication system.

In Step ST21, the second communication control unit 32 submits the information notified from the modem to the first communication control unit 31. More specifically, the second communication control unit 32 submits RIL_E_SUCCESS to the first communication control unit 31.

The cellular telephone device 1 thus changes the setting to include the LTE communication system in the scan target in a case in which communication standby takes place using the domestic public network, thereby effectively using the LTE.

Figure 7:
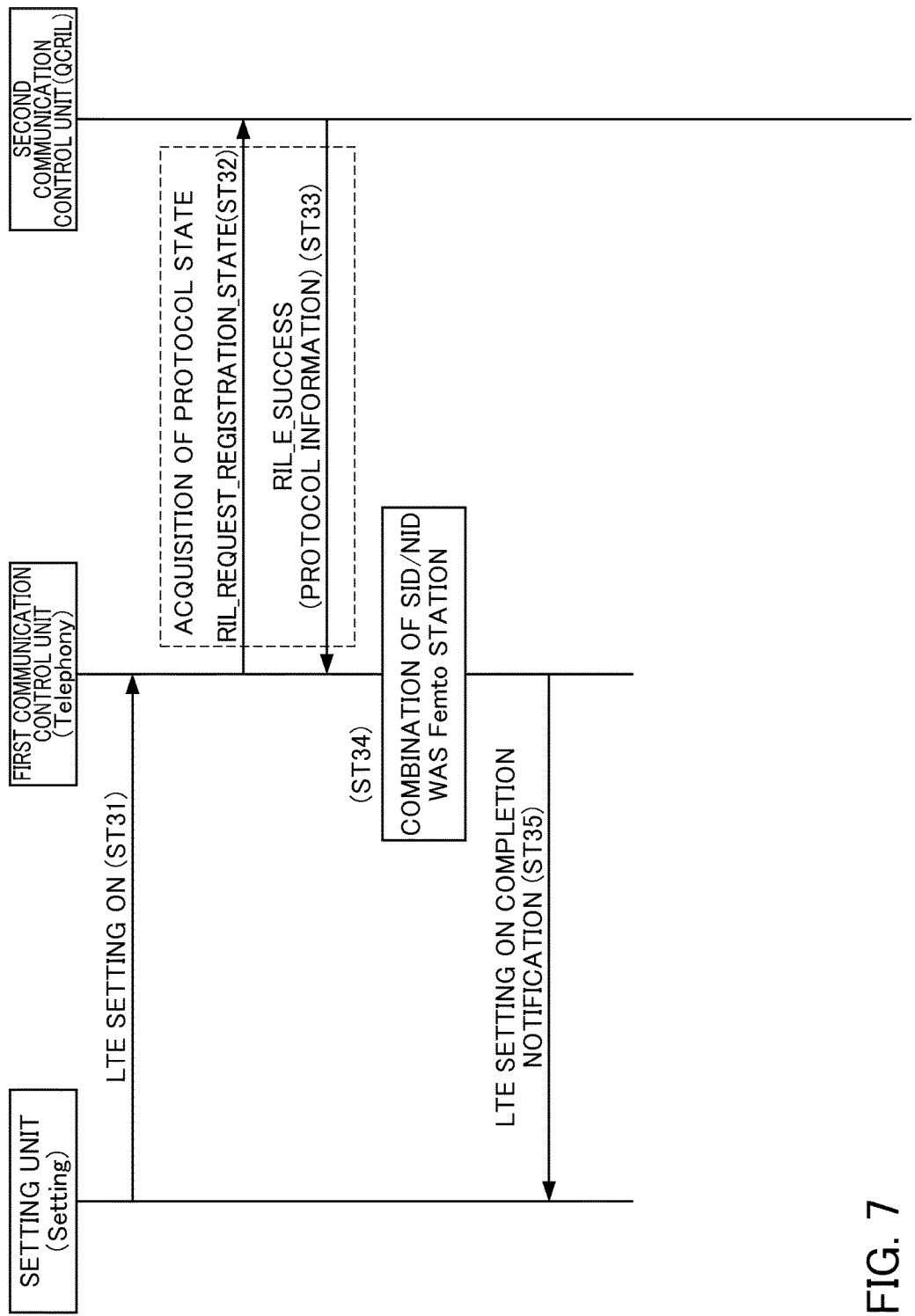
FIG. 7 is a timing chart of setting in which the LTE is switched between ON (enabled) and OFF (disabled) by a user operation.

Next, a case in which setting is made in which the LTE is switched between ON (enabled) and OFF (disabled) by a user operation, in a state of standby of communication in the overseas public network or 1×Femto, is described with reference to a timing chart shown in FIG. 7. FIG. 7 is a timing chart of setting in which the LTE is switched between ON (enabled) and OFF (disabled) by a user operation.

In Step ST31, the setting unit 33 notifies the first communication control unit 31 of reception of change of LTE setting.

In Step ST32, the first communication control unit 31 acquires the protocol state. More specifically, the first communication control unit 31 submits RIL_REQUEST_REGISTRATION_STATE to the second communication control unit 32 and makes a request for information of the communication system used for standby on the modem side.

In Step ST33, the second communication control unit 32 submits the information notified from the modem to the first communication control unit 31. More specifically, the second communication control unit 32 submits RIL_E_SUCCESS to the first communication control unit 31.

In Step ST34, the first communication control unit 31 determines the type of the communication system used for standby on the modem side based on the protocol information received in Step ST33. More specifically, the first communication control unit 31 determines the type of the communication system based on the SID and the NID included in the protocol information.

In Step ST35, the first communication control unit 31 submits a notification of reception of change of the LTE setting.

The cellular telephone device 1 thus maintains setting, in a case in which the setting is made in which the LTE is switched between ON (enabled) and OFF (disabled) by a user operation, in a state of standby of communication in the overseas public network or 1xFemto. However, in a case of standby of communication in the overseas public network or 1xFemto, the cellular telephone device 1 only retains the change of setting, without performing a process of reconnection or the like.

When the setting of LTE is changed between ON (enabled) and OFF (disabled), the cellular telephone device 1 can notify the user of the change by displaying on the display unit 21 and the like.

As described above, when a communication system of the highest priority among communication systems which are scan target goes out of a service area, the cellular telephone device 1 of the present Example operates to exclude the communication system from the scan target.

In the present Example, LTE has been described to be of the highest priority; however, the present invention is not limited thereto. Another communication system can also be of the highest priority. In this case, the another communication system is excluded from the scan target under predetermined conditions.

The scan in the present Example can also be referred to as a search or an acquisition trial.

The communication device of the present invention is not limited to the cellular telephone device 1. For example, the present invention can also be applied to various apparatuses, for example a PHS (trade mark: Personal Handy Phone System), a PDA (Personal Digital Assistant), a gaming machine, a navigation system, a personal computer, a communication module having only a communication function, and the like.

In the present Embodiment, a configuration and operations of the cellular telephone device have been described. However, the present invention is not limited thereto. The cellular telephone device can also be configured as a communication method or a program provided with the components, for allowing an effective use of LTE while suppressing unnecessary processes by determining, for each area, whether LTE is to be included in the scan target or not.

The cellular telephone device can also be realized by storing a program that realizes functions of the cellular telephone device in a computer-readable storage medium and making a computer system read and execute the program thus stored in the storage medium.

The "computer system" used herein includes an OS and hardware such as peripherals. The "computer-readable storage medium" indicates a portable medium such as a flexible disk, a magnetic optical disk, ROM, and CD-ROM, and a storage device such as a hard disk which is built in a computer system.

The "computer-readable storage medium" can also include a matter that dynamically retains the program for a short period of time such as a communication wire in a case of submitting the program through a network such as internet or a communication line such as a telephone line; and a matter that retains the program for a fixed period of time such as volatile memory in the computer system which acts as a server or a client in the above described case. The program can be a program that realizes a part of the above described functions. The program can be a program that realizes the above described functions in combination with a program which has already been stored in the computer system.

EXPLANATION OF REFERENCE NUMERALS

1 Cellular telephone device
31 First communication control unit
32 Second communication control unit
33 Setting unit

The invention claimed is:

1. A communication device comprising:
a controller configured to scan at least one communication system in a scan target,
wherein the controller is further configured to enable or disable a first communication system according to a manual input via a user interface, and
wherein the controller is further configured to exclude the first communication system from the scan target if the controller performs communication standby in a foreign public network, even if the first communication system has been enabled according to the manual input via the user interface.

2. The communication device according to claim 1, wherein the controller includes the first communication system in the scan target when the controller performs communication standby in a domestic public network.

3. The communication device according to claim 2, wherein the controller starts to scan communication systems including the first communication system.

4. The communication device according to claim 1, wherein the controller continues excluding the first communication system from the scan target even if no communication system with which communication can be established is found.

5. The communication device according to claim 1, wherein the controller determines whether a network used for the communication standby is a foreign public network or a domestic public network, based on information transmitted from a base station.

6. The communication device according to claim 1, wherein the controller scans the first communication system first in the scan target.

7. A method for controlling communication device configured to scan at least one communication system in a scan target, the method comprising:
setting to enable or disable a first communication system according to a manual input via a user interface; and
excluding the first communication system from the scan target if performing communication standby in a foreign public network, even if the setting is to enable the first communication system according to the manual input via the user interface.

8. The communication device according to claim 1, wherein the communication device has a power-saving state and a non-power-saving state, and wherein, after the controller has excluded the first communication system from the scan target, when the controller performs communication standby by using a domestic public network:

when the communication device is in the non-power-saving state, the controller includes the first communication system in the scan target, and restarts the first communication system; and, when the communication device is in the power-saving state, the controller includes the first communication system in the scan target, but does not restart the first communication system.

9. The communication device according to claim 1, wherein, when the first communication system is disabled, the controller excludes the first communication system from the scan target even when the controller performs communication standby by using a domestic public network.

10. The communication device according to claim 1, wherein the controller is configured to exclude the first communication system from the scan target, without instruction from a network, if the controller performs communication standby in the foreign public network, even if the first communication system has been enabled according to the manual input via the user interface.

11. The method according to claim 7, wherein the first communication system is excluded from the scan target, without instruction from a network, if performing communication standby in the foreign public network, even if the setting is to enable the first communication system according to the manual input via the user interface.

* * * * *